(12) United States Patent
Mendes de Araujo et al.

(10) Patent No.: US 12,704,177 B2
(45) Date of Patent: Aug. 11, 2026

(54) COATING FOR A PISTON RING

(71) Applicant: MAHLE International GmbH, Stuttgart (DE)

(72) Inventors: Fabio Mendes de Araujo, Waterford, MI (US); Luiz Felipe Viegas Rosa Rezende, Itajubá (BR); Nikhil Nachappa Tychodianda Kushalappa, Bloomfield Hills, MI (US); Samuel Jose Muniz De Toledo, Itajubá (BR)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 18/631,180

(22) Filed: Apr. 10, 2024

(65) Prior Publication Data

US 2024/0376983 A1 Nov. 14, 2024

Related U.S. Application Data

(60) Provisional application No. 63/464,675, filed on May 8, 2023.

(51) Int. Cl.
*F16J 9/26* (2006.01)
*C23C 28/00* (2006.01)

(52) U.S. Cl.
CPC ............... *F16J 9/26* (2013.01); *C23C 28/343* (2013.01)

(58) Field of Classification Search
CPC ................................. F16J 9/26; C23C 28/343
See application file for complete search history.

(56) References Cited

U.S. PATENT DOCUMENTS

| | | | | |
|---|---|---|---|---|
| 6,325,385 | B1 | 12/2001 | Iwashita | |
| 9,429,099 | B2 * | 8/2016 | Wilder | F02F 3/0015 |
| 9,709,169 | B2 * | 7/2017 | Hayashi | C09D 5/00 |
| 11,408,508 | B2 | 8/2022 | Stumpf | |
| 2009/0051122 | A1 * | 2/2009 | Tamegai | F16J 9/26 277/592 |
| 2013/0043659 | A1 | 2/2013 | Ito | |
| 2013/0075977 | A1 | 3/2013 | An | |
| 2014/0225329 | A1 * | 8/2014 | Hayashi | C09D 179/08 277/442 |
| 2015/0226327 | A1 * | 8/2015 | Sasaki | F02F 5/00 277/442 |
| 2015/0252901 | A1 * | 9/2015 | Kennedy | C23C 4/129 427/451 |

(Continued)

FOREIGN PATENT DOCUMENTS

| | | | |
|---|---|---|---|
| CN | 206738019 | U * | 12/2017 |
| DE | 102011089284 | A1 | 3/2013 |

(Continued)

OTHER PUBLICATIONS

European Search Report dated Sep. 18, 2024 for EP 24172432.7.

*Primary Examiner* — Eugene G Byrd
(74) *Attorney, Agent, or Firm* — Fishman Stewart PLLC

(57) ABSTRACT

A piston ring and method of forming includes a base portion formed of a metallic material, an outer contact surface and an inner contact surface extending between a first face and a second face that is opposite the first face of the piston ring, a chromium coating layer on the second face, the outer contact surface, and the inner contact surface, a layer of diamond-like carbon (DLC) disposed over the chromium coating layer on the outer contact surface, and a phosphate layer on a first face.

20 Claims, 12 Drawing Sheets

(56) References Cited

U.S. PATENT DOCUMENTS

| | | | | |
|---|---|---|---|---|
| 2017/0073605 | A1* | 3/2017 | Sasaki | F16D 69/025 |
| 2017/0254418 | A1* | 9/2017 | Stong | C23C 28/042 |

FOREIGN PATENT DOCUMENTS

| | | | | | |
|---|---|---|---|---|---|
| DE | 102017221606 | A1 | | 6/2019 | |
| EP | 2963317 | A1 | | 1/2016 | |
| JP | 2000120870 | A | | 4/2000 | |
| JP | 2017025963 | A | * | 2/2017 | C23C 22/22 |

* cited by examiner

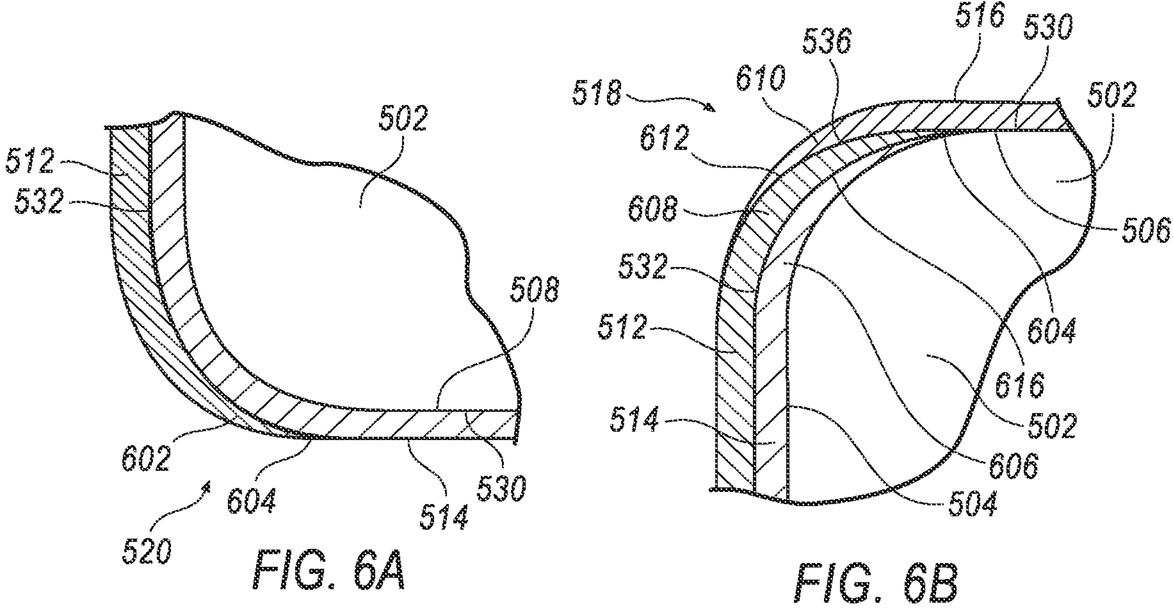
FIG. 6A
FIG. 6B
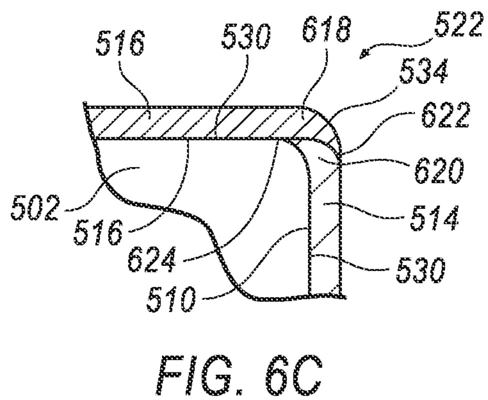
FIG. 6C

COATING FOR A PISTON RING

CROSS-REFERENCE

This application claims priority to and the benefit of U.S. Prov. App. No. 63/464,675 filed May 8, 2023, the contents of which are hereby incorporated by reference in their entirety.

FIELD OF TECHNOLOGY

Exemplary fields of technology for the present disclosure may relate to, for example, pistons and piston rings, and particularly for a coating for a piston ring.

BACKGROUND

A power cylinder assembly of an internal combustion engine generally includes a reciprocating piston disposed within a cylindrical cavity of an engine block. One end of the cylindrical cavity is closed while another end of the cylindrical cavity is open. The closed end of the cylindrical cavity and an upper portion or crown of the piston defines a combustion chamber. The open end of the cylindrical cavity permits oscillatory movement of a connecting rod, which joins a lower portion of the piston to a crankshaft, which is partially submersed in an oil sump. The crankshaft converts linear motion of the piston (resulting from combustion of fuel in the combustion chamber) into rotational motion.

The power cylinder assembly typically includes one or more piston rings and a cylindrical sleeve or cylinder liner, which is disposed within the engine block and forms side walls of the cylindrical cavity. The piston rings are disposed in grooves formed in the lateral walls of the piston, and extend outwardly from the piston into an annular space delineated by the piston wall and the cylinder liner. During movement of the piston within the cylindrical cavity, the piston rings bear against the cylinder liner. The piston rings have at least two functions. First, they inhibit gas flow from the combustion chamber into the oil sump through the annular space between the piston and the cylinder liner. Second, they minimize oil flow from the oil sump into the combustion chamber.

Piston rings generally must survive extreme temperatures and pressures resulting from the combustion cycle. The outer surface of a piston ring that bears upon the cylinder liner or bore surface often includes a hard surface coating, or is otherwise treated to create a hardened outer surface that is more durable than an untreated surface.

Accordingly, some known power cylinder assemblies include piston rings with a chromium plated lateral side, i.e., the side of the ring positioned to interface with piston ring groove surfaces, with diamond-like-carbon (DLC) being coated over the chromium. Chromium is positioned on the lower surface of the piston ring, and the DLC is positioned on the outer radial surface of the piston ring.

However, DLC has the ability to bond to and commonly is done on a face over chromium, particularly at a corner region of the piston ring and where the underside and the outer radius meet. As a result, run-in of the piston ring (during early operation of the engine after newly built), can present challenges and the DLC can overheat and become damaged, chipping on the DLC running face during this initial operation.

As such, there is a need to improve piston ring designs.

SUMMARY

The disclosure is directed toward a piston ring and a method of forming same.

According to a first aspect, a piston ring includes a base portion formed of a metallic material, an outer contact surface and an inner contact surface extending between a first face and a second face that is opposite the first face of the piston ring, a chromium coating layer on the inner contact surface, the outer contact surface, and the second face, a layer of diamond-like-carbon (DLC) positioned on the chromium coating layer of the outer contact surface.

Pursuant to an implementation, a phosphate layer is provided on the first face of the piston ring. The phosphate layer may be applied directly to the metallic material of the base portion. The phosphate layer may have a thickness of ≤3 μm. The phosphate layer may partially overlap the DLC at an upper outer corner region of the base portion and may partially overlap the chromium coating layer at an upper inner corner region of the base portion. The phosphate layer may have a diminishing thickness along the upper outer corner region and the upper inner corner region.

Additionally or alternatively, the DLC may have an approximately constant thickness along the outer contact surface and a diminishing thickness at a lower outer corner region of the base portion and the upper outer corner region of the base portion. The DLC may have a thickness of 2 μm to 25 μm, at least in the portions of approximately constant thickness.

Additionally or alternatively, the chromium coating layer may have an approximately constant thickness along the outer contact surface, the lower outer corner region, the second face, the lower inner corner region of the base portion, and the inner contact surface. Further, the chromium coating layer may have a diminishing thickness at the upper outer corner region and at the upper inner corner region.

The chromium coating layer may have a thickness of between 10 μm and 20 μm with a thickness variation of equal to or less than 5 μm. The chromium coating layer may have a flatness of equal to or less than 2 μm along at least the second face and the inner contact surface.

Additionally or alternatively, a physical vapor deposition (PVD) chrome interlayer may be interposed between the DLC and the chromium coating layer along the outer contact surface. The chrome interlayer may have a thickness of less than or equal to 1 μm.

Additionally or alternatively, a polymer layer may be provided overlaying the DLC.

According to a second aspect, a method of forming a piston ring includes providing a base portion formed of a metallic material, the base portion having a first surface and a second surface that is opposite the first surface; applying a chromium coating layer on the first face, the second face, the outer contact surface, and the inner contact surface; and depositing a layer of diamond-like carbon (DLC) over the chromium coating layer on the outer contact surface.

Pursuant to an implementation, the method includes keystone lapping the second face to flatten an outer surface of the chromium coating layer to a straightness variation of 2 μm or less.

The method may include brushing the second face to remove nodules from the chromium coating layer after the keystone lapping.

Additionally or alternatively, the method may include keystone grinding the first face to remove substantially all of the chromium coating layer from the first face to expose the base portion and roughen an outer surface of the base portion; and depositing a phosphate layer on the first face. The phosphate layer may be applied directly to the metallic material of the base portion by phosphating. Further, the phosphate layer may at least partially overlay the DLC at an upper corner region of the base portion and partially overlap the chromium coating layer at an upper inner corner region of the base portion.

Pursuant to an implementation, the method includes keystone grinding the second face before applying the chromium coating layer.

Additionally or alternatively, the method may include outer diameter (OD) lapping the chromium coating layer along the outer contact surface before depositing the DLC; gap grinding the chromium coating layer at a piston ring gap before depositing the DLC; inner diameter (ID) brushing the chromium coating layer along the inner contact surface after the gap grinding and before depositing the DLC; and finish gap grinding the chromium coating layer at the piston ring gap after depositing the DLC and before keystone grinding the first face. A first or initial gap grinding may be performed before applying the chromium coating layer.

Pursuant to an implementation, the keystone lapping is performed after the OD lapping and before the gap grinding. Alternatively, the keystone lapping may be performed after the finish gap grinding.

Pursuant to an implementation, the method includes depositing a chrome interlayer over the chromium coating layer along the outer contact surface, so that the chrome interlayer is interposed between the chromium coating layer and the DLC. The chrome interlay may be deposited via physical vapor deposition, whereas the chromium coating layer may be applied galvanically. The chrome interlayer may be deposited in the same step as the DLC. Additionally or alternatively, the chrome interlay may be deposited at a low temperature, e.g., at about 200° C. or less.

Pursuant to a further implementation, a polymer layer is deposited on an external surface of the layer of DLC.

Various other features and advantages will be made apparent from the following detailed description and drawings.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations of the present invention are described in detail by referring to the drawings as follows:

FIG. 6A is a close-up view of the piston ring of FIG. 5;

FIG. 6B is a close-up view of the piston ring of FIG. 5;

FIG. 6C is a close-up view of the piston ring of FIG. 5;

DETAILED DESCRIPTION

Figure 1:
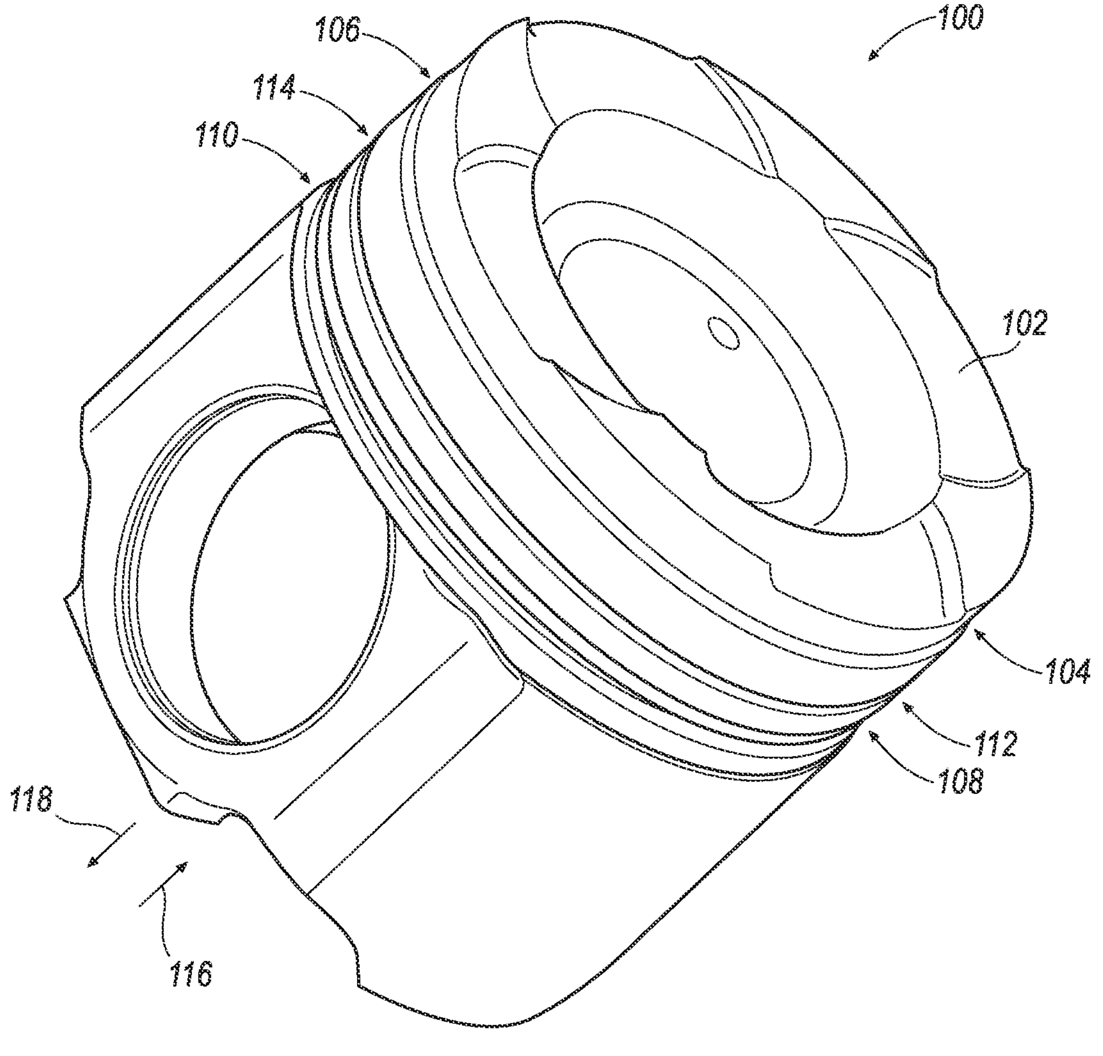
FIG. 1 is a view of an exemplary piston assembly.

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Various exemplary illustrations are provided herein that include a piston assembly having two or more rings that, when positioned within the grooves of the piston assembly provide various functions during piston operation. In one example, a piston assembly may have two rings that include a combustion ring and a scraping ring. The combustion ring typically blocks a majority of combustion gases from passing the piston assembly of an internal combustion engine, so that there is little or no transfer of gasses to the crank. The scraping ring provides a scraping motion during a downward motion of the piston assembly, and a sliding motion during an upward motion of the piston assembly.

In another example, a three ring piston assembly includes a combustion ring, an oil control ring, and a scraping ring positioned between the combustion ring and the oil control ring. The third or lower oil control ring controls the supply of oil to a liner, which lubricates the piston skirt and the other rings. In some exemplary approaches, a piston assembly may include a piston head having first and second compression ring grooves, compression rings within the grooves, an oil control ring groove, and an oil control ring assembly.

According to various exemplary illustrations, a piston ring may include a base portion formed of a metallic material, an outer (radial) contact surface and an inner (radial) contact surface extending between a first face or surface and a second face or surface that is opposite the first face of the piston ring. A chromium coating is provided on the inner contact surface, the outer contact surface, and the second face. A phosphate layer may be provided on the first face. A diamond-like carbon coating (DLC) is deposited on the radially outermost surface over the chromium coating. A chrome interlayer may be interposed between the DLC and the chromium coating layer.

DLC is a class of amorphous carbon material that displays properties such as very low coefficient of friction, high hardness, excellent wear resistance, and very low wear. The DLC coating may be deposited using a Cathodic Arc Physical Vapor Deposition (PVD) process. The Cathodic Arc PVD coating process involves using a cathodic arc source or target (negatively charged), such as graphite or other suitable carbon material, and depositing a thin film over a substrate or anode (positively charged). The target material can be placed either in a vacuum chamber, or filled with inert gas such as Argon, along with the substrate to be coated. Once the chamber is evacuated, a high voltage pulse is applied to the target material. This voltage pulse causes an arc discharge, which vaporizes the target material. The vaporized material then condenses onto the substrate, forming a thin film of DLC coating. The DLC coating that is formed is amorphous and may include a combination of sp3 hybridized carbon atoms and fillers such as sp2 carbon atoms, up to 3% of hydrogen, and trace amounts of other metals to impart desired properties of the material. Pursuant to an implementation, the DLC coating used herein may exhibit characteristics including a proportion of $sp^3$ to $sp^2$ ranging from 0.42 to 2.33 and an Rmr (0.2-0.5) profile greater than at least 25% and/or an Rmr (0.3-0.5) profile greater than at least 50%, as described in co-owned patent application Ser. No. 15/289,097 filed Oct. 7, 2016, now U.S. Pat. No. 10,400,895B2, the contents of which are hereby incorporated by reference in their entirety. Pursuant to an implementation, the DLC coating used herein may further exhibit characteristics wherein the DLC coating over the intermediate coating wherein the DLC coating includes a first layer of DLC having a first hardness and a first porosity, and a second layer of DLC having a second hardness lower than the first hardness and a second porosity greater than the first porosity, as described in co-owned claiming priority to patent application Ser. No. 17/488,942 filed on Sep. 29, 2021, now U.S. Publication 2022/0090680A1, the contents of which are hereby incorporated by reference in their entirety.

Generally, a wear environment between lateral surfaces of the piston ring, e.g., the lower radially extending surface, and the receiving ring groove is different as compared with that typical of the generally vertical, radially outermost surface of the ring and the mating cast iron surface of a cylinder liner. For example, material properties of a machined steel piston ring groove engaging a machined piston ring provide one difference. A second difference relates to the reciprocal vertical movement of the piston ring with respect to the groove surface as the piston moves up and down. Moreover, the ring flexes radially inwardly and radially outwardly, rubbing against the piston ring groove surface during piston operation. Accordingly, disclosed is a method of forming a piston ring that includes providing a base portion formed of a metallic material, applying a DLC over the radially outward surface, and applying a chromium layer to a lateral surface and/or an inner diameter (ID) surface of the base portion, the lateral surface and the ID surface configured to interface with a piston ring groove.

Referring to FIG. 1 an exemplary piston assembly 100 is illustrated. Piston assembly 100 includes a piston head 102 including an upper compression ring 104 positioned within an upper compression ring groove 106, and an oil control ring 108 positioned within a lower compression ring groove 110. The piston head 102 further includes a scraping or scraper ring 112 positioned within a middle groove 114. Rings 104, 108, and 112 seal against cylinder bore surfaces during reciprocal motion of the piston assembly 100 within a cylinder bore. Piston head 102 moves in a first or upward direction 116 during the upstroke phase of the piston assembly 100 and a second or downward direction 118 during the downstroke phase of the piston assembly 100.

Figure 2A:
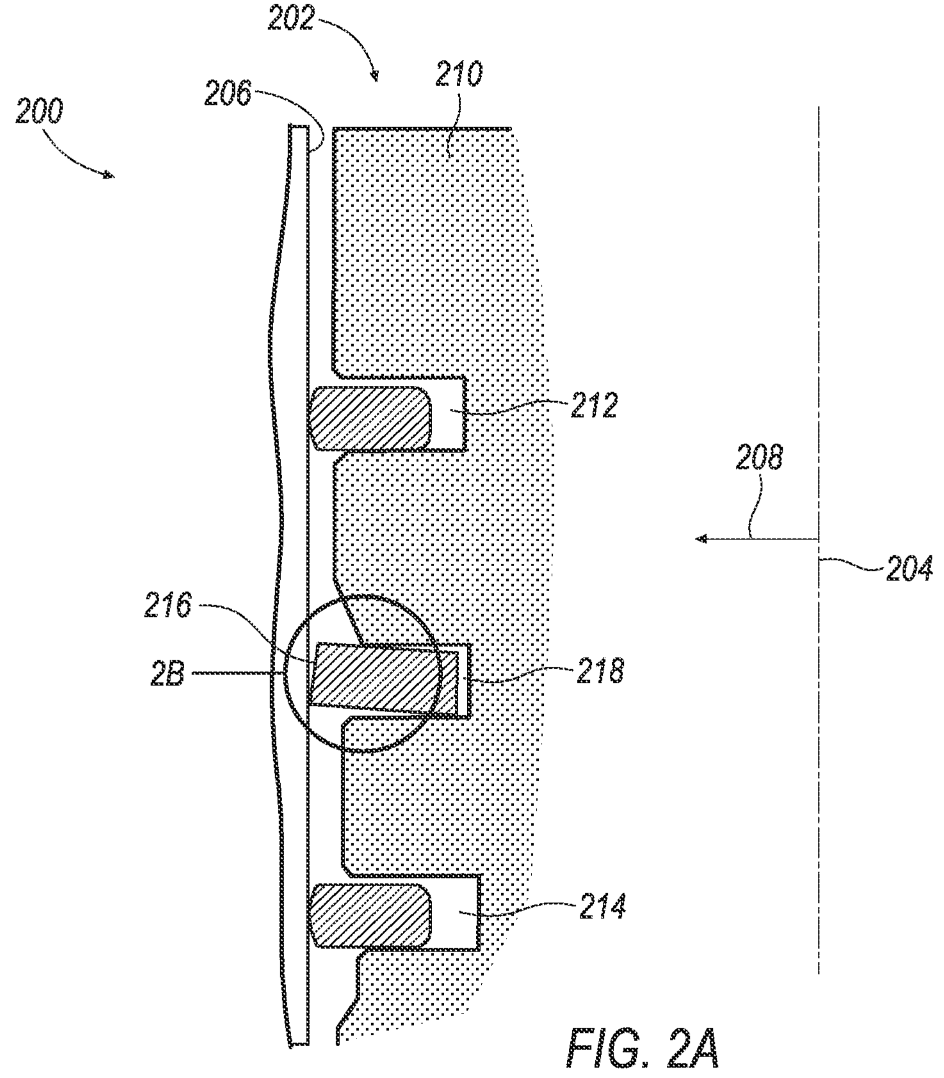
FIG. 2A is a view of the rings of the piston assembly of FIG. 1.

Referring now to FIG. 2A, a piston assembly 200 for an internal combustion engine includes a cylinder bore 202 having a central axis 204 (e.g., a reciprocating axis) and a cylinder wall 206 that is equidistant from central axis 204. Piston assembly 200 includes a radial axis 208 that is orthogonal to central axis 204. Piston assembly 200 includes a piston 210 having two or more ring grooves, including a combustion ring and groove 212, an oil control ring and groove 214, and a scraper ring 216 positioned within a scraper ring groove 218.

Figure 2B:
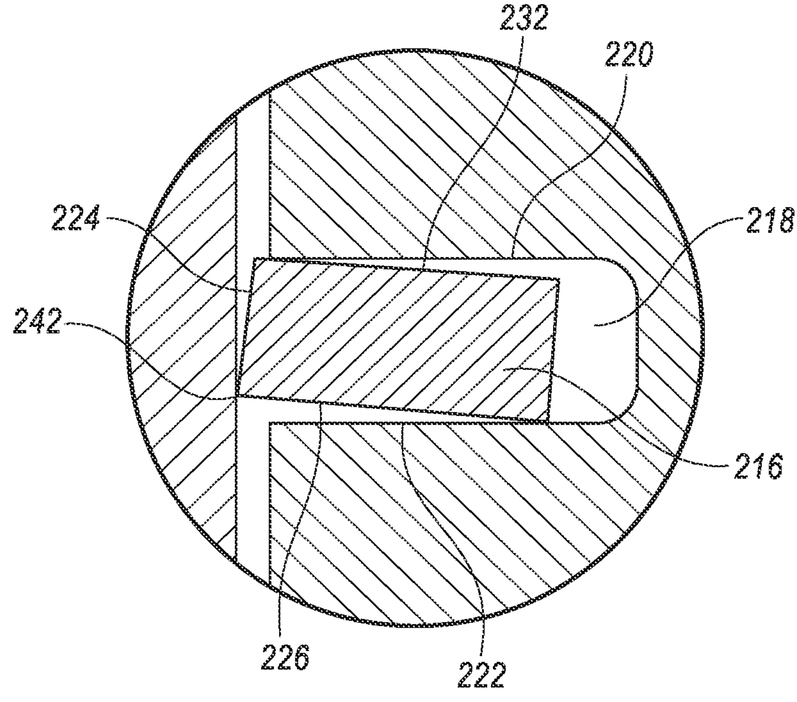
FIG. 2B is a cross-sectional view of a piston ring in a groove of a piston.

Details of a cross section of scraper ring 216 are shown in FIG. 2B. Referring to FIG. 2B, groove 218 is formed between an upper groove surface 220 and a lower groove surface 222. Scraper ring 216 is positioned within groove 218 such that scraper ring 216 is constrained against upper groove surface 220 when piston 210 moves in downward direction 118 (corresponding with FIG. 1, during which scraping occurs), and scraper ring 216 is constrained against lower groove surface 222 when piston 210 moves in upward direction 116. In one exemplary approach as illustrated herein, scraper ring 216 is positioned within groove 218, between groove 212 and groove 214.

In general, when there are three ring grooves the ring in groove 212 is typically a combustion ring that serves primarily to prevent combustion gases from passing beyond piston 210. The ring in groove 214 typically serves primarily as an oil control ring that controls the distribution of oil for lubrication purposes. Thus, if general practice is followed, ring 216 may be placed in intermediate groove 218. Further, although scraper ring 216 is illustrated in a three-ring design, it is contemplated that scraper ring 216 may also be implemented in other multi-groove designs such as a two-ring groove mechanism, having only a combustion ring and the a scraper ring 216, which would then serve as an oil control ring, as well. Further, scraper ring is shown in a slightly non-rectangular arrangement with a surface 224 being non-orthogonally positioned with respect to a lower surface 226 and an upper surface 232. A corner 242 is formed between surface 224 and surface 226.

Any one or all three of the rings in grooves 212, 214, and 218 may benefit from a ring fabricated according to the disclosure. Thus, any one or all of the piston rings of FIG. 2A may include features of the piston ring and coating thereof described herein.

Figure 3A:
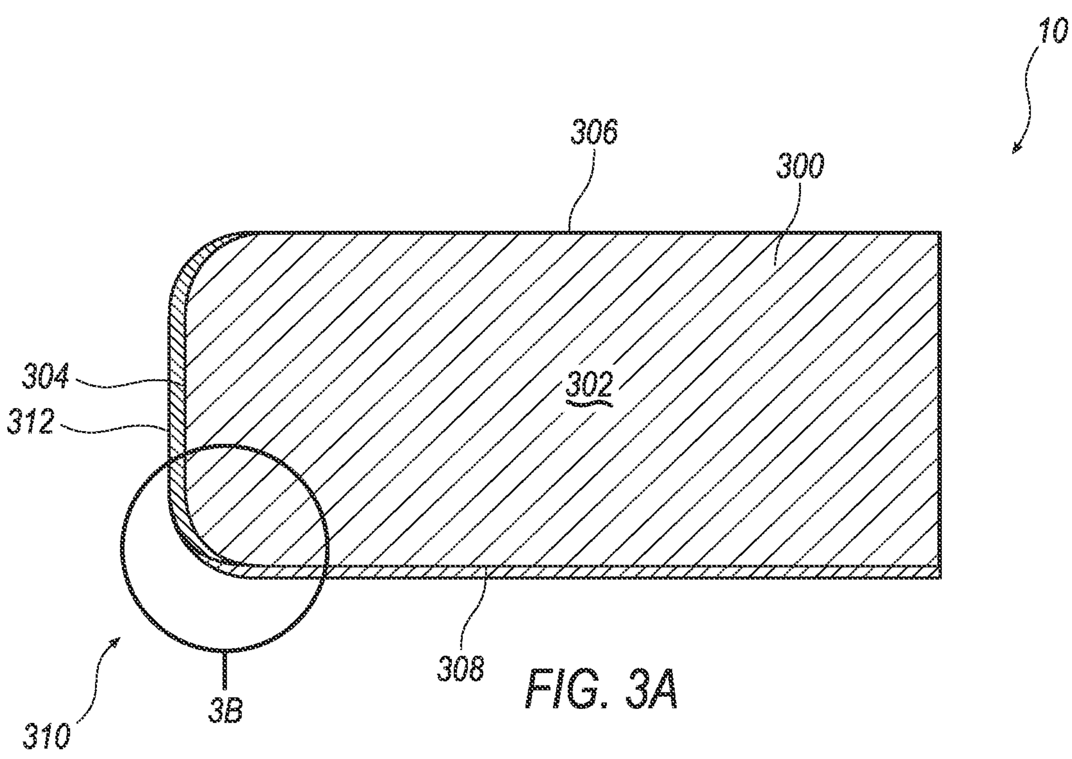
FIG. 3A is a cross-sectional view of a piston ring according to an example.
Figure 3B:
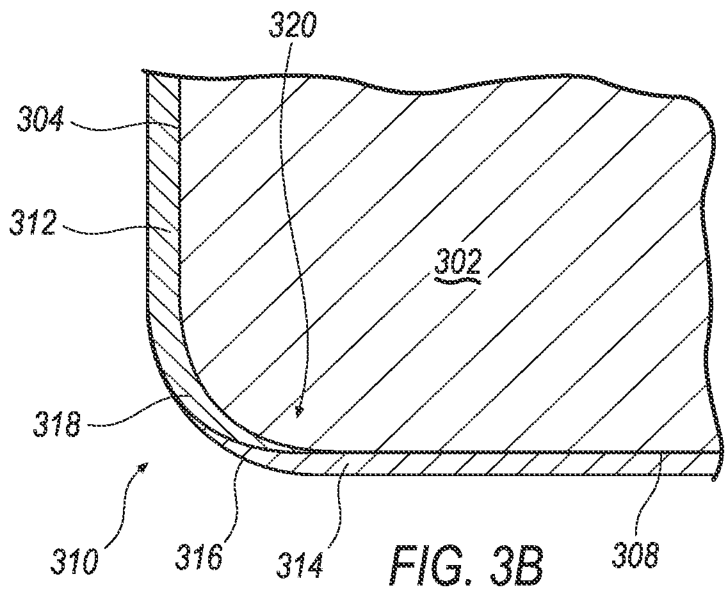
FIG. 3B is a close-up view of the piston ring of FIG. 3A.

FIG. 3A is a cross-sectional view of a piston ring 300 according to the disclosure, and FIG. 3B is a close-up view of a corner of the piston ring 300 of FIG. 3A. The piston ring 300 includes a base portion 302 formed of a metallic material. The metallic material may be composed of steel, e.g., carbon steel and/or non-nitrided steel and/or chrome silicon steel wire. The base portion 302 comprises an outer contact surface or outer contact face (hereafter outer contact face) 304 extending between a first face or first side or upper side or upper face (hereafter first face) 306 and a second face or second side or bottom side or bottom face (hereafter second face) 308 that is opposite first face 306 of piston ring 300 relative to a central axis of the piston ring and/or of the piston and/or the cylinder bore. Pursuant to the illustrated example, the first face 306 is the top face and the second face 308 is the bottom face. A corner region 310 is provided at an intersection location of outer contact surface 304 and the second face 308. Corner region 310 may be a relatively sharp corner having a radius of a few hundred μm (or microns), to a millimeter or more. A layer of diamond-like carbon (DLC) 312 is positioned on outer contact surface 304. DLC 312 is approximately a constant thickness on outer contact surface 304 and is of diminishing thickness 318 in corner region 310, diminishing to zero thickness 320 at or beyond corner region 310 (as DLC 312 wraps about corner region 310 and extends in diminishing thickness 318 to zero thickness 320). A chromium coating layer 314 is formed or positioned on second face 308, chromium coating layer 314 formed over diminishing thickness 318 of DLC layer 312, and chromium coating layer 314 itself of diminishing thickness 316 in corner region 310. A phosphate layer 322 may be provided along the first face 306. The phosphate layer 322 may at least partially overlap or overlay the DLC layer 312 in the (upper) corner region in a similar manner to the chromium coating layer 314 at the (lower) corner region 310.

This layer of diminishing thickness 316 of chromium coating layer 314, according to the disclosure, is influenced by the forming processes and electrical and mechanical properties of the DLC and chromium. For instance, formation of DLC layer 312 is by known processes such as ion beam deposition, sputtering, cathodic arc, electron beam, lasers, or RF plasma deposition, as examples, and formation of DLC 312 may be of any known process thereof according to the disclosure. Due to the nature of formation of DLC 312, DLC 312 is (as described above) generally of a constant thickness on outer contact surface 304, but in the corner region the thicknesses diminishes as shown in diminishing thickness 318. Thus, the diminishing thickness 318 of DLC 312 in corner region 310 may occur due to the nature of how the DLC is formed, and may not be due to any post processing (such as to form this diminishing thickness). Nevertheless, the diminishing thickness 318 may also be formed by further post processing, such as grinding or other techniques for material removal in corner region 310 and about the circumference of base portion 302 (base portion 302 representing a circular piston ring as described).

Once DLC 312 is formed and of diminishing thickness 318, then the chromium layer is applied to the face of the piston ring. According to the disclosure and referring still to FIGS. 3A and 3B, chromium coating layer 314 is deposited using an electrochemical process. Typically, such process is dependent on the electrically conductive nature the base material on which the chromium is plated, in this case base portion 302 which represents a base material for a piston ring. However, although it is generally considered that DLC is an electrical insulator, it is understood that although an insulator there is some electrical conduction that occurs through the DLC, in this case DLC 312. Electrical conduction in something like an insulator is also dependent on the thickness of the layer through which any current passes.

Thus, electrical conduction through DLC, though very limited, is more pronounced in the region of diminishing thickness 318 of DLC 312 and about corner region 310. During deposition of chromium coating layer 314 on second face 308 of base portion 302, electrical conduction through the DLC occurs to a varying degree through the diminishing thickness 318 of DLC 312, and diminishing thickness 316 of chromium coating layer 314 is thereby formed over DLC 312.

As such, a piston ring may include a base portion formed of a metallic material, an outer contact surface extending between a first face and a second face that is opposite the first face of the piston ring, forming a corner region at an intersection location of the outer contact surface and the second face, a layer of diamond-like-carbon (DLC) positioned on the outer contact surface, and a chromium coating layer on the second face, the chromium coating layer positioned over the DLC layer in the corner region. Pursuant to an implementation, a phosphate layer may be provided on the first face.

The DLC is approximately a constant thickness of the DLC on the outer contact surface. The DLC is of diminishing thickness of DLC in the corner region, starting at the approximately constant thickness of the DLC and diminishing to zero thickness of the DLC at or beyond the corner region. The chromium coating layer is approximately a constant thickness of the chromium coating layer on the second face. The chromium coating layer is approximately a constant thickness of the chromium coating layer on the second face. The chromium coating layer has a hardness of at least 8.5 Mohs hardness. The DLC is an amorphous carbon material.

Also according to an aspect, a method of forming a piston ring includes providing a base portion formed of a metallic material, the base portion having a first side and a second side that is opposite the first side with an outer contact surface extending between the first side and the second side, depositing a layer of diamond-like-carbon (DLC) on the outer contact surface, and depositing a chromium coating layer on the second (bottom) side and over the DLC layer in a corner region at an intersection location of the outer contact surface and the second side. Pursuant to an implementation, the method may further including applying a phosphate layer on the first (top) side of the base portion.

In one example, the chromium coating layer has a hardness of at least 8.5 Mohs hardness. In one example, the DLC is an amorphous carbon material.

Figure 4:
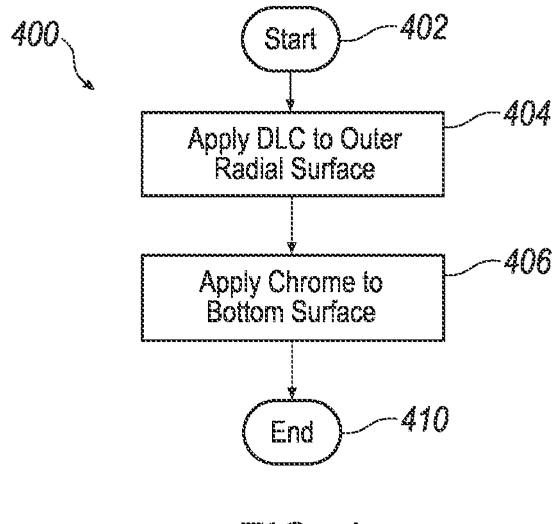
FIG. 4 illustrates steps of a method of producing a piston ring according to FIG. 3A.

At a high level, and referring to FIG. 4, a method of forming a piston ring 400 starts 402 and includes applying DLC to an outer radial surface of a piston ring 404, and applying a chrome or chromium based layer to a bottom surface of the piston ring 406, such that the chromium coating layer is positioned over the DLC layer in a corner region between the outer radial surface and the bottom surface.

In addition, although the disclosed method is described as pertaining to a ring that is in the middle groove of the three grooves illustrated in FIGS. 1 and 2A, it is contemplated that the disclosed method and apparatus may be used in any of the ring grooves, in which wear occurs due to frictional wear of the ring in the groove, or improved flatness is needed to better seal the ring against the piston to control the blow-by of oil and/or combustion gases.

The method includes depositing the DLC having approximately a constant thickness on the outer contact surface. The method includes depositing the DLC having a diminishing thickness of DLC in the corner region, starting at the approximately constant thickness of the DLC and diminishing to zero thickness of the DLC at or beyond the corner region. The method includes depositing the chromium coating layer having approximately a constant thickness of the chromium coating layer on the bottom face. The method includes depositing the chromium coating layer having a diminishing thickness in the corner region, starting at the approximately constant thickness of the chromium coating layer and diminishing to zero thickness of the chromium coating layer at or beyond the corner region. The method includes depositing the layer of DLC using a physical vapor deposition (PVD) process.

Figure 5:
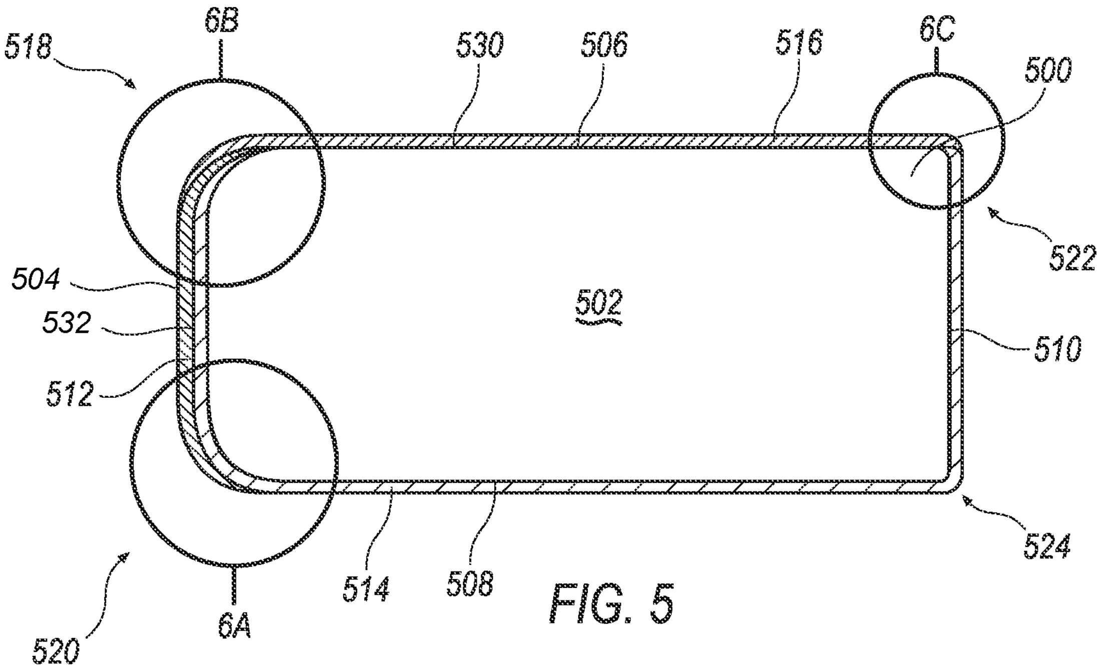
FIG. 5 is a cross-sectional view of a piston ring according to another example.

FIG. 5 is a cross-sectional view of a piston ring 100 according to the disclosure, and FIGS. 6A, 6B, and 6C are close-up views of a corner of the piston ring of FIG. 5. A piston ring 500 includes a base portion 502 formed of a metallic material, e.g., steel such as carbon steel and/or non-nitrided steel and/or chrome silicon steel wire. The base portion 502 includes an outer contact surface 504 extending between a first face 506 (e.g., upper face or side) and a second face 508 (e.g., lower face or side) that is opposite first face 506 of piston ring 500, forming an upper outer corner region 518 at an intersection location of outer contact surface 504 and the first face 506 and a lower outer corner region 520 at an intersection location of outer contact surface 504 and the second face 508. The base portion 502 includes an inner contact surface 510 extending between the first face 506 and the second face 508 of piston ring 500, forming a first (upper) inner corner region 522 at an intersection location of inner contact surface 510 and the first face 506 and a second (lower) inner corner region 524 at an intersection location of inner contact surface 510 and the second face 508.

The piston ring 500 includes a chromium coating layer 514 provided on one or more of the outer contact surface 504, the second (lower) face 508, and the inner contact surface 510. In the illustrated example, the chromium coating layer 514 is provided on each of the outer contact surface 504, the second (lower) face 508, and the inner contact surface 510. The chromium coating layer 514 may have a thickness of 10 μm to 20 μm with a thickness variation of ≤5 μm. A flatness of the chromium coating layer, at least along the second face 508 and the inner contact surface 510, may be ≤2 μm. A DLC 512 is provided on the chromium coating layer 514 along the outer contact surface 504, e.g., DLC 512 overlays the chromium coating layer 514 to form an outer sliding layer. The DLC may have a thickness of 2 μm to 25 μm. A chromium interlayer 532 may be interposed between the chromium coating layer 514 and the DLC 512 along the outer contact surface 504, to improve adhesion between DLC 512 and chromium coating layer 512. The chrome interlayer 532 may have a thickness of less than or equal to (≤) 1 μm. A phosphate layer 516 is provided on the first (upper) face 506, and may be applied directly to the base portion 502, at least in some regions, along the first face 506, and may also partially overlap the DLC 512 in upper outer corner region 518. The phosphate layer 516 may have a thickness of ≤3 μm. The phosphate layer 516 may facilitate improvements in wear and lubrication characteristics as well as help prevent rust and/or oxidation.

FIGS. 6A, 6B, and 6C are close-up views of the lower outer corner region 520, the upper outer corner region 518, and the upper inner corner region 522, respectively. Corner regions 518, 520, 522, 524 may be a relatively sharp corner having a radius of a few hundred μm, to a millimeter or more. The chromium coating layer 514 may be formed or positioned on second face 508, inner contact surface 510, and outer contact surface 504 with an approximately constant thickness (e.g., greater than 5 μm, in particular 10-20 μm) on second face 508, inner contact surface 510, and outer contact surface 504. As used herein, an approximately constant thickness for the chromium coating layer 512 means a thickness variation of less than 5 μm.

Referring to FIG. 6A, the chromium coating layer 514 may be of approximately constant thickness on second face 508 and maintains the approx. constant thickness as the chromium coating layer 514 wraps around lower outward corner region 520 to outer contact surface 504. DLC 512 is provided over the chromium coating layer 514 along the outer contact face 504 and may form an outermost sliding layer. The DLC 512 may have an approximately constant thickness on outer contact surface 504 and may be of diminishing thickness 602 in lower outward corner region 520, diminishing to zero thickness 604 at or beyond lower outward corner region 520 (as DLC 512 wraps about lower outward corner region 520 and extends in diminishing thickness 602 to zero thickness 604). Pursuant to an implementation, a chromium interlayer 532 is interposed between the DLC 512 and the chromium coating layer 514. The chromium interlayer 532 may have a thickness of 1 μm or less. The chromium interlay 532 may be formed in a manner similar to the DLC 512, e.g., an approx. constant thickness along the outer contact face 504 and a diminishing thickness at the top and bottom outer corner regions 518, 520.

Referring now to FIG. 6B, chromium coating layer 514 may be of approximately constant thickness on outer contact surface 504 and may have a diminishing thickness 606 in upper outward corner region 518, diminishing to zero thickness 614 at or beyond upper outward corner region 518 (as chromium coating layer 514 wraps about upper outward corner region 518 and extends in diminishing thickness 606 to zero thickness 614). DLC 512 wraps around chromium coating layer 514 on outer contact surface 504 at an approximately constant thickness. DLC 512 may then be of diminishing thickness 608 in upper outward corner region 518, diminishing to zero thickness 616 at or beyond upper outer corner region 518 (as DLC 512 wraps about upper outward corner region 518 and extends in diminishing thickness 608 to zero thickness 616). The phosphate layer 516 is provided along the first (upper) face 506 and may have an approximately contact thickness along of the first face 506 and a diminishing thickness 610 in upper outer corner region 518, diminishing to zero thickness 612 at or beyond upper outer corner region 518 (as phosphate layer 516 wraps about upper outward corner region 518 and extends in diminishing thickness 610 to zero thickness 612). As such, the phosphate layer 516 may partially overlap or overlay the DLC 512 in the upper outer corner region 518. Pursuant to an implementation, the phosphate layer 516 has a thickness of 3 μm or less.

Referring now to FIG. 6C, the chromium coating layer 514 may be of approximately constant thickness on inner contact surface 510 and has a diminishing thickness 620 in upper inner corner region 522, diminishing to zero thickness 624 at or beyond upper inner corner region 522 (as chromium coating layer 514 wraps about upper inner corner region 522 and extends in diminishing thickness 620 to zero thickness 624). The phosphate layer 516 is of approximately constant thickness on first face 506 and is of diminishing thickness 618 in upper inner corner region 522, diminishing to zero thickness 622 at or beyond upper inner corner region 522 (as phosphate layer 516 wraps about upper inner corner region 522 and extends in diminishing thickness 618 to zero thickness 624). As such, the phosphate layer 516 may partially overlap the chromium coating layer 514 at least in the upper inner corner region 522.

As shown in FIG. 5, the chromium coating layer 512 may have an approximately constant thickness along the second (lower) face 508, the lower inner corner region 524, and the inner contact surface 510, and then diminishes in thickness 620 in the upper inner corner region 522 until zero thickness 624.

Without wishing to be bound by theory, the chromium coating layer 514 having a diminishing thickness 606 in the upper outward corner region 518, may be influenced by the forming processes and electrical and mechanical properties of the DLC and chromium. For instance, of the DLC 512 may be formed by known processes such as physical vapor deposition (PVD) including ion beam deposition, sputtering, cathodic arc, electron beam, lasers, or RF plasma deposition, as examples. Due to the nature of formation of DLC 512, DLC 512 is (as described above) generally of a constant thickness on outer contact surface 504, but in the upper outward corner region 518 and lower outward corner region 520, the thicknesses diminish as shown in diminishing thickness 608 and diminishing thickness 602, respectively. Thus, according to the disclosure diminishing thickness 608 of DLC 512 in upper outer corner region 518 and diminishing thickness 602 of DLC 512 in lower outer corner region 520 occur due to the nature of how the DLC 512 is formed, and may not be due to any post processing (such as to form this diminishing thickness). Nevertheless, according to the disclosure, diminishing thickness 608 and 602 may also be formed by further post processing, such as grinding or other techniques for material removal in upper outward corner region 518 and lower outward corner region 520 and about the circumference of base portion 502 (base portion 502 representing a circular piston ring as described).

The chromium coating layer 514 may be deposited using an electrochemical process (e.g., electroplating). Typically, such process is dependent on the electrically conductive nature the base material on which the chromium is plated, in this case base portion 502 which represents a base material for a piston ring.

Figure 7:
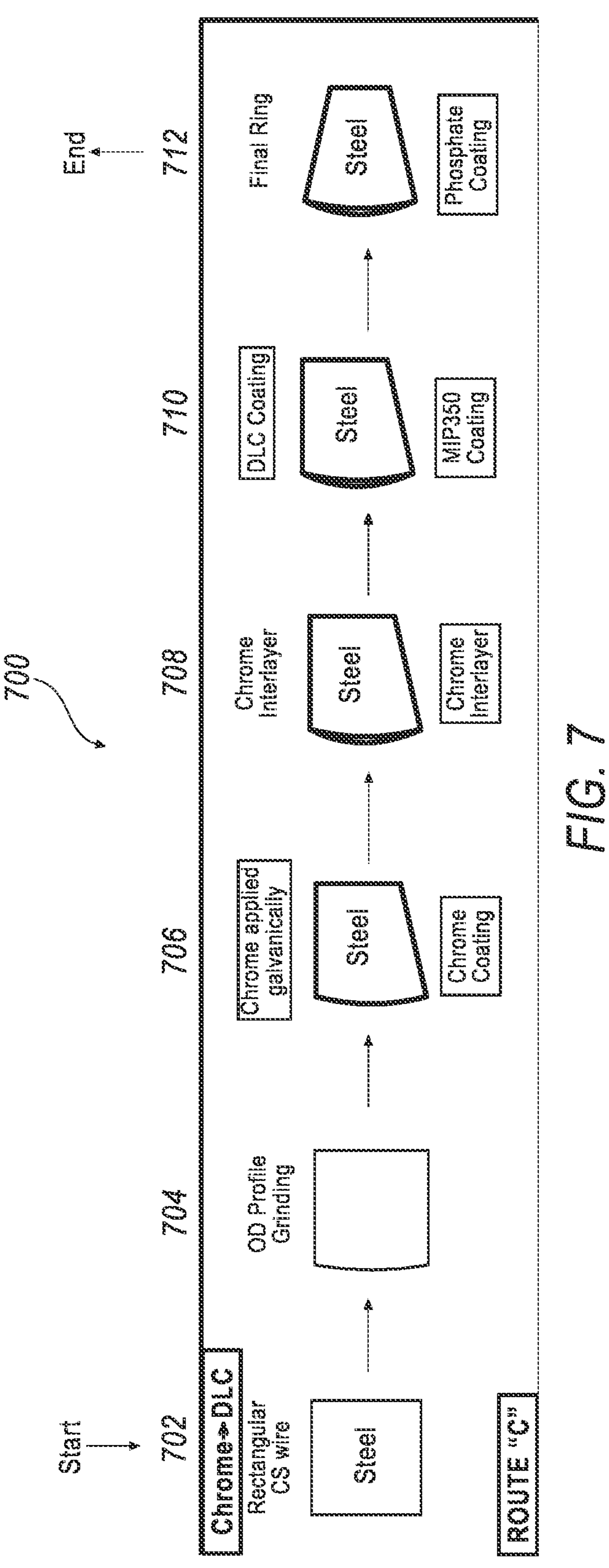
FIG. 7 illustrates a flow chart for an exemplary method of producing a piston ring according to FIG. 5.

Referring to FIG. 7, a method of forming a piston ring 700 according to an example is shown. At block 702, a metallic base portion is provided. At block 704, the outer diameter is formed to a preferred profile for the piston ring. The chromium coating layer is applied galvanically 706 to the periphery of the base portion, including the first face, second face, outer contact surface, and inner contact surface. A chrome interlayer is applied 708 to the outer contact surface, over the chromium coating layer. The chromium interlayer (also referred to as chrome strike) may be applied by PVD process at a low temperature (e.g., about 200° C.) to prevent hardness reduction of the chromium coating layer. The chromium interlayer may have a thickness of about 1 μm or less, and may be generally softer than the chromium coating layer to help improve adhesion and running-in characteristics. At block 710, DLC is then applied (e.g., via PVD) to an outer contact surface, such that the DLC layer is positioned over chromium interlay and the chromium coating layer. The first face is processed through grinding or another technique to remove the chromium coating layer, prior to applying a phosphate layer 712 to the first face.

Applying a chromium coating layer on the second face protects the ring and bottom groove. The process of making the piston ring is modified such that the first face is ground after the chromium coating layer application such that the first face can be layered with phosphate. Chrome thickness, which is generally greater than 5 μm at least in regions of constant thickness (e.g., along the outer contact face, second (bottom) face, and inner contact face) is notoriously hard to control in a production environment. Applying the chromium coating layer on the second face and phosphate on the first face allows the ring to maintain the ideal piston-ring clearance in a production setting.

FIGS. 8-11 show further developments of the method 700 in FIG. 7. In the exemplary methods for forming a piston ring, it will be appreciated that the second face (bottom side) goes through "keystone" grinding prior to full chromium plating (e.g., application of the chromium coating layer). Keystone may refer to the shape of the ring, where a first (top) face and a second (bottom) face are wedge-shaped. Keystone grinding or keystoned may refer to the process of grinding the face to the keystone shape, and may also be referred to as side grinding. After the second face is keystoned, chromium is applied to the periphery of the base portion, including the first face, the second face, the outer contact surface, and the inner contact surface. A chromium interlay may be applied onto the chromium coating layer along the outer contact surface. DLC is then applied to the outer contact surface over of the chromium interlayer and/or the chromium coating layer. Since the thickness of chromium is difficult to control, the first face (top surface) is keystoned after the DLC is applied. The bottom keystone is used to identify how much of the top surface needs to be keystoned to maintain the ideal clearance. Once the top surface is keystoned, a phosphate layer is deposited on the top surface. This process ensures the ideal thickness and size of the piston ring. An intermediate gap grinding may occur before or after the full chromium plating.

Figure 8:
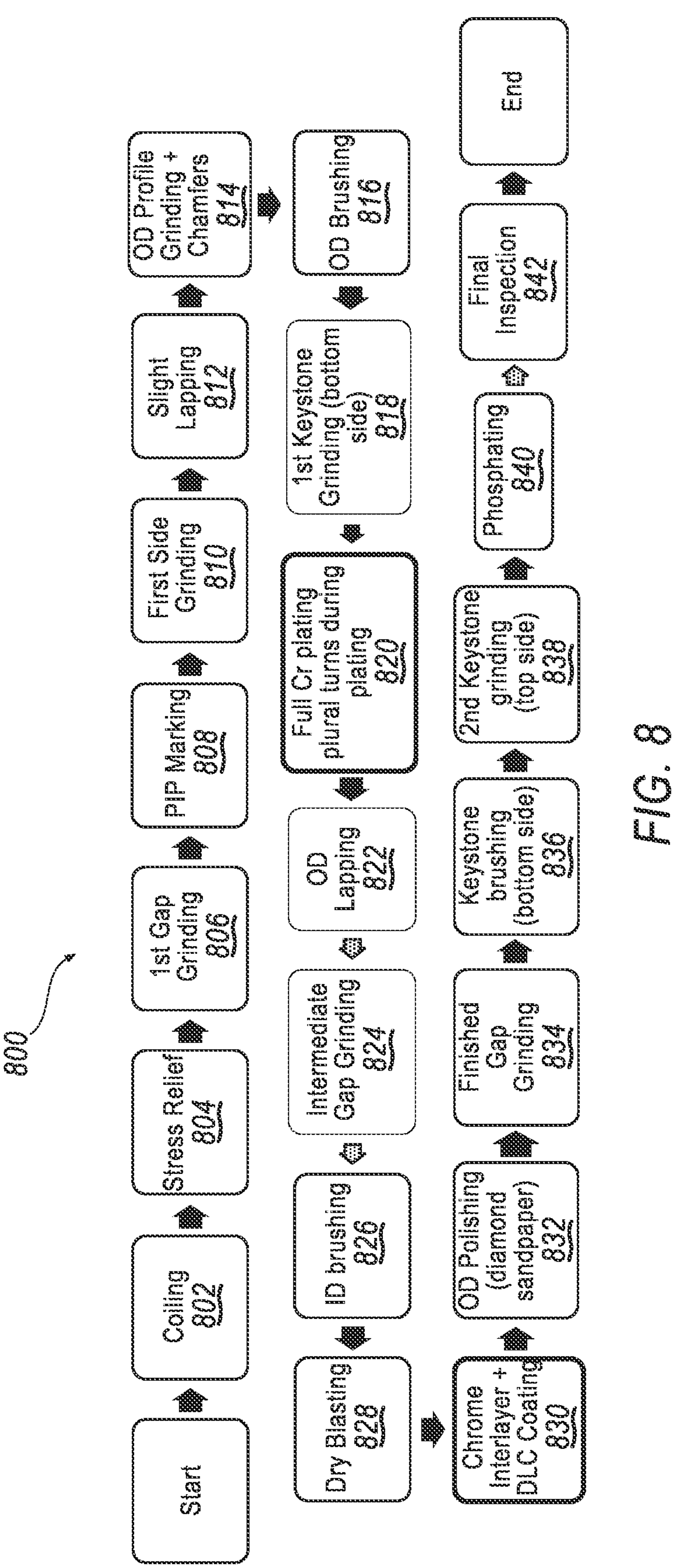
FIG. 8 illustrates steps of a method according to the disclosure.

Referring to FIG. 8, an exemplary method 800 for producing a piston ring is shown according to an implementation. The method 800 includes providing a base portion, which may including coiling 802 the base material (e.g., steel), stress relief 804 (e.g., annealing and/or tempering), first gap grinding 806 of the piston ring gap, PIP marking 808 (e.g., to mark top side of the piston ring), first side grinding 810, slight lapping 812, shaping the base portion by outer diameter (OD) profile grinding and optional chamfers 814, and OD brushing 816.

After the base portion has been provided through one or more of steps 802-816, first keystone grinding 818 is performed on the second (bottom) face of the base portion, to shape and/or roughen the second face. At step 820, chromium plating is applied to at least the second (bottom) face and the inner contact surface to form the chromium coating layer. Pursuant to an implementation, a full chromium plating is applied to the base portion, including the outer contact surface, the inner contact surface, the first (top) face, and the second (bottom) face. The chromium plating is applied galvanically, and may include at least 3 turns of the base portion (cathode) during electroplating to ensure appropriate thickness and quality. Next, OD lapping 822 is performed to flatten the chromium coating layer along the outer contact surface, then second or intermediate gap grinding 824, inner diameter (ID) brushing 826, and dry blasting 828.

At step 830, DLC is applied via PVD to the outer contact surface over the chromium (plating) coating layer. Optionally, a chrome interlayer is applied via PVD in step 830 to the chromium coating layer and then the DLC is applied onto the chrome interlayer. It will be appreciated that the chrome interlayer may be applied in a separate step from the DLC, for example after dry blasting 1028 and before applying DLC coating 1030. After application of DLC, OD polishing 832 (e.g., diamond sandpaper) is performed on the DLC, then third or finished gap grinding 834, and side or keystone brushing on the second (bottom) face.

At step 838, second keystone grinding is performed on the first (top) face/side to remove the chromium plating along the first side, exposing the material of the base portion, and then a phosphate coating is applied via phosphating along the first side at step 840. The piston ring is inspected 842, and then the process ends.

Figure 9:
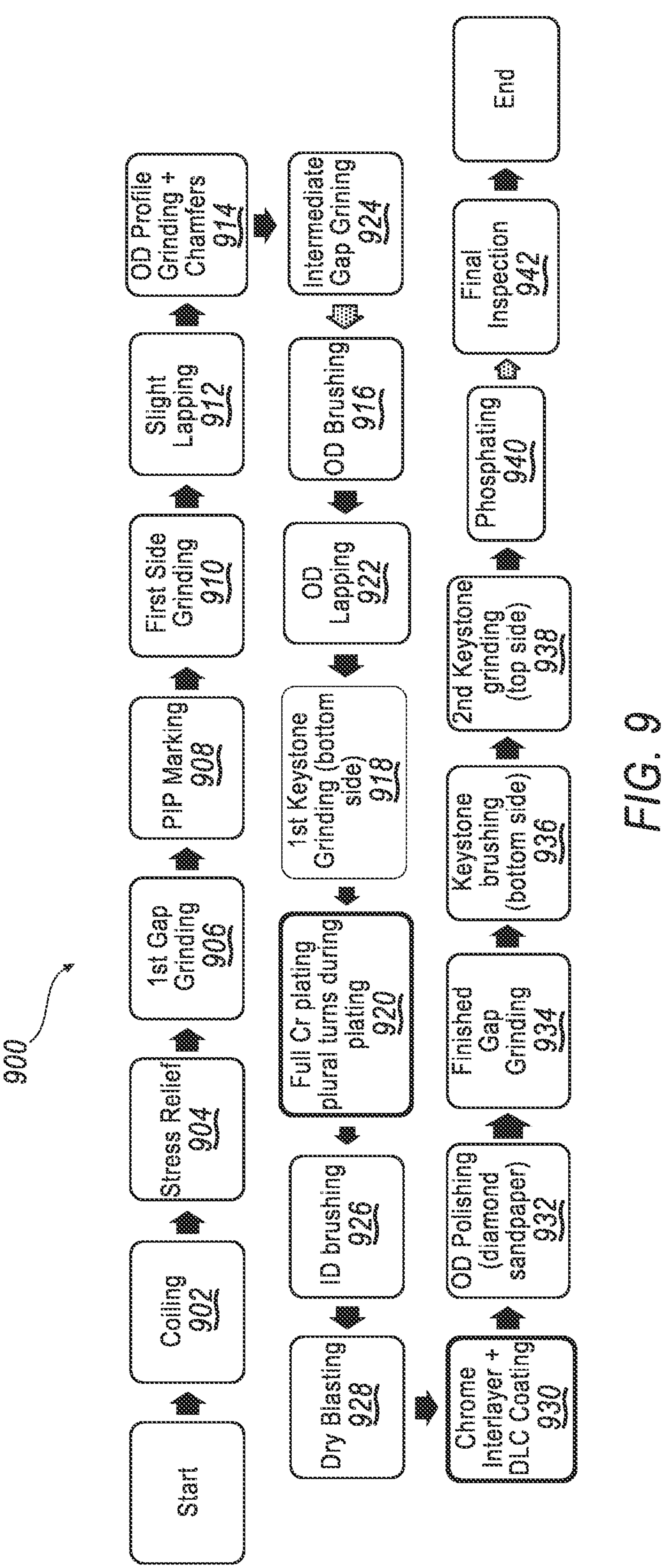
FIG. 9 illustrates steps of a method according to the disclosure.

FIG. 9 shows an exemplary method 900 for producing a piston ring is shown according to a further implementation. FIG. 9 differs from FIG. 8 only in the order of the intermediate gap grinding 924 and the OD lapping 922, wherein the intermediate gap grinding 924 occurs before the OD lapping 922, e.g., between the OD profile grinding 914 and the OD brushing 916, and the OD lapping 922 is performed after OD brushing 916 and before the first side (keystone) grinding of the second (bottom) face. Otherwise, the process remains the same as in FIG. 8, as represented by like reference numerals.

Figure 10:
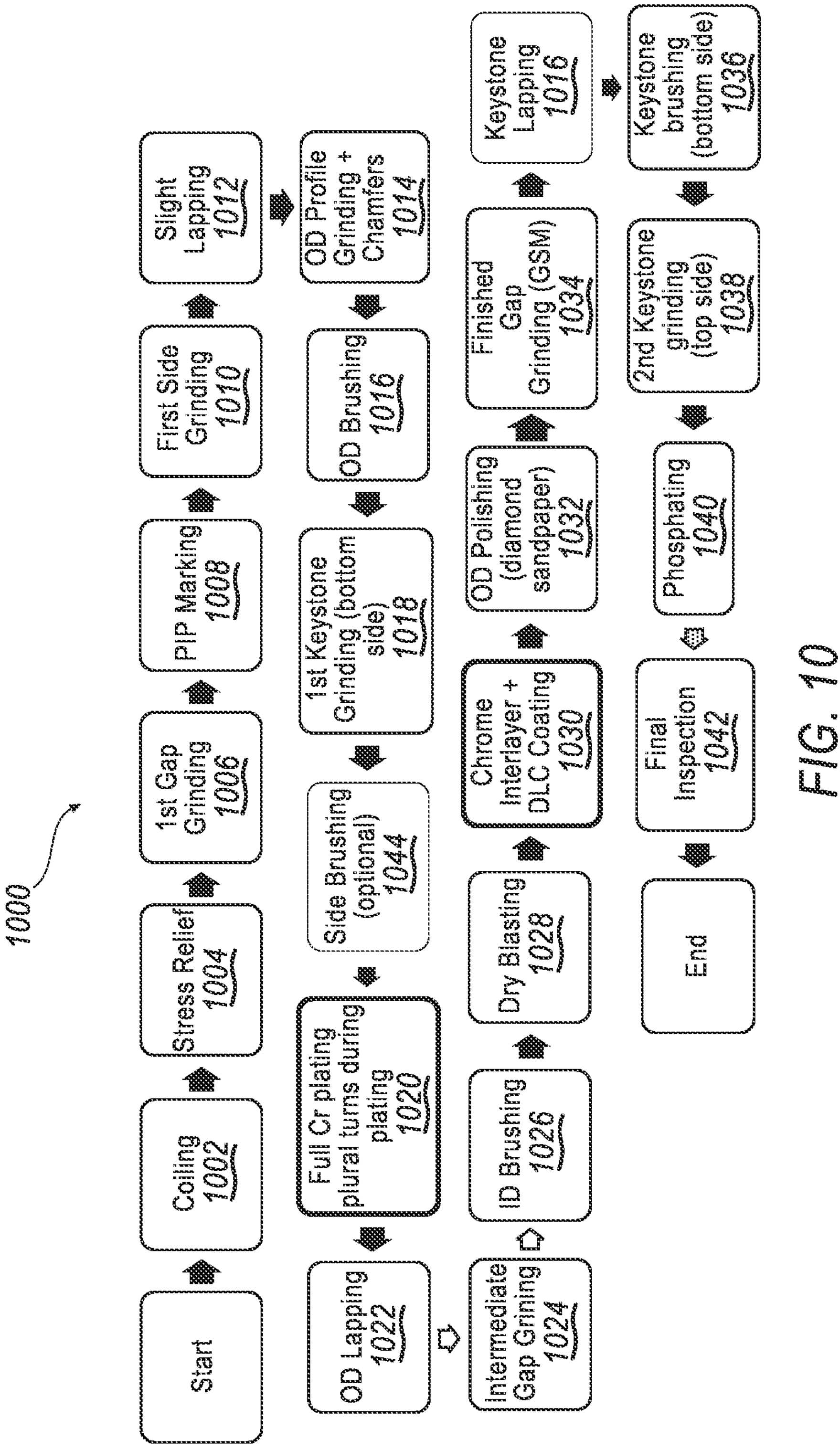
FIG. 10 illustrates steps of a method according to the disclosure.

Referring to FIG. 10, an exemplary method 1000 for producing a piston ring is shown according to a further implementation. The exemplary method 1000 includes providing a base portion of the piston ring, which may including one or more of forming the base portion or coil 1002 from a base material (e.g., steel), stress relief 1004 (e.g., tempering/annealing or other heat treatment at a temperature below its critical temperature for sufficient time so that recrystallization of the base metal may occur to relieve internal stresses), first gap grinding 1006 (e.g., grinding the gap circumferentially between a first end and a second end of the coil/base portion), PIP marking 1008 (e.g., to mark top side of the piston ring), a first side grinding 1010 where the first face and/or the second face are ground (e.g., rough ground), a slight lapping 1012, shaping the base portion by grinding the outer diameter (OD) profile (e.g., the outer contact surface) into a desired profile and optional chamfering 1014, and OD brushing 1016.

At step 1018, the base portion undergoes further shaping via first keystone grinding or side face grinding (if not shaped to a keystone) on the second face, so that the second (bottom) face is ground to form a keystone surface. Keystone grinding 1018 before chrome plating improves precision and tolerance control of the piston ring. An optional side brushing 1044 may be performed after the first keystone grinding on the second face and/or first face and before application of the chromium plating, to break up any nodules on the ring surface.

At step 1020, the base portion is galvanically plated with chromium by fully immersing the base portion (cathode) in an electrolyte containing chromium to provide a full galvanic chrome plating on the base portion, thereby providing a chrome coating layer on the inner and outer contact surfaces, first and second faces, and corner regions. The anode may be a chrome metal, for example. The base portion is turned one or more times, and in an implementation at least three (3) times, to ensure a full, robust coating of satisfactory thickness (e.g., between 10 and 20 μm as measured by x-ray fluorescence) as well as to help facilitate reductions in thickness variation. It will be appreciated that the thickness of the chrome plating may be slightly greater than a desired or predetermined thickness (e.g., 20 μm) after the electrodeposition process, which thickness is subsequently reduced through lapping and/or grinding steps to the predetermined thickness of between 10 and 20 μm with a thickness variation of ≤5 μm and a straightness of ≤2 μm on the inner, outer and second/bottom face.

At step 1022, outer diameter (OD) lapping is then performed along the outer contact surface of the base portion to remove excess chrome material and flatten the surfaces to reach a predefined chrome coating thickness variation, which according to an implementation may be ≤5 μm. The optional side brushing 1044 may be performed after the OD lapping to break up nodules on the chrome surface, but without removal of material.

After flattening the chrome coating to a predetermined thickness and thickness variation along the outer diameter of the piston ring, the method 1000 may include a second or intermediate gap grinding 1024 performed on the piston ring gap, further flattening any chrome build-up at the ring/coil ends. At step 1026, inner diameter (ID) brushing, e.g., of the inner contact surface, is performed to remove nodules on the chrome surface, and then dry blasting 1028 the coil (e.g., the outer contact surface).

At step 1030, the running or sliding face may be formed on the outer contact surface, over the chrome coating layer. Step 1030 includes forming a chrome interlayer overlaying the chrome coating layer along the outer contact face, such as by PVD. The PVD chrome interlayer is softer than the galvanic chrome plating and improves adhesion between the chrome plating and DLC coating. The PVD chrome interlayer may form a thin film (e.g., ≤1 μm) over the galvanic chrome plating along the outer contact surface and some or all of the upper and lower outer corner regions of the base portion. The DLC coating is then formed via PVD applied to the outer contact surface, e.g., over the chrome interlayer, to form an outer sliding surface of the piston ring. The DLC coating may have a thickness of 2 μm to 25 μm. The chrome interlayer and the DLC coating may be applied at a low temperature, e.g., around 200° C. or less, to help reduce reductions of hardness that may be associated with higher application temperatures. The chrome interlayer may be formed during the PVD process for the DLC in a single step. Alternatively, the chrome interlayer may be applied in a separate step before the DLC.

Following step 1030, including applying the chrome interlayer and/or applying the DLC coating in implementations where a chrome interlayer is not used, an outer diameter (OD) polishing 1032 is performed on the DLC coating using diamond sandpaper. At step 1034, a third or finished gap grinding is performed on the piston ring gap, so that the first and second ends of the ring/coil are finish ground to a desired roughness.

At step 1046, keystone (or side) lapping is performed on one or both of the side faces of the base portion to remove portions of the chrome material and flatten the surfaces of the coating. The keystone lapping 1046 may flatten the chromium coating layer along the second (bottom) face by removing outer portions of the chromium material to form the chromium coating with a desired thickness (10 μm to 20 μm), thickness variation (≤5 μm), and straightness (≤2 μm). Additionally or alternatively, the keystone lapping 1046 may remove portions of the chromium material along the first (top) face, such as at the upper inner corner region, to facilitate flattening and shaping the chromium coating layer. At step 1036, keystone brushing is then performed on the second face to reduce or remove nodules on the chrome surface.

At step 1038, second keystone grinding 1038 is performed on the first (top) face to remove all or substantially all of the chrome material along the first face from upper inner corner region to upper outer corner region, exposing the material of the base portion, as well as to roughen the exposed surface of the base material. The second keystone grinding 1038 may also help shape the upper outer corner region to provide diminishing thickness of the DLC and/or the upper inner corner region to provide the diminishing thickness of the chrome coating. At step 1040, a phosphate coating is applied the first (top) face by phosphating to form a phosphate coating thickness of 22pprox. ≤3 μm (e.g., between 2 μm and 3 μm), which coating may be applied directly to the base portion along the first face (via the second keystone grinding 1038) and at least partially overlap the DLC on the upper outer corner region and at least partially over the chromium coating layer on the upper outer corner region. The phosphate coating helps increases corrosion resistance as well as facilitates lubrication and wear resistance. The phosphate coating may comprise, e.g., magnesium phosphate. A final inspection 1042 may occur, and then the process ends.

Figure 11:
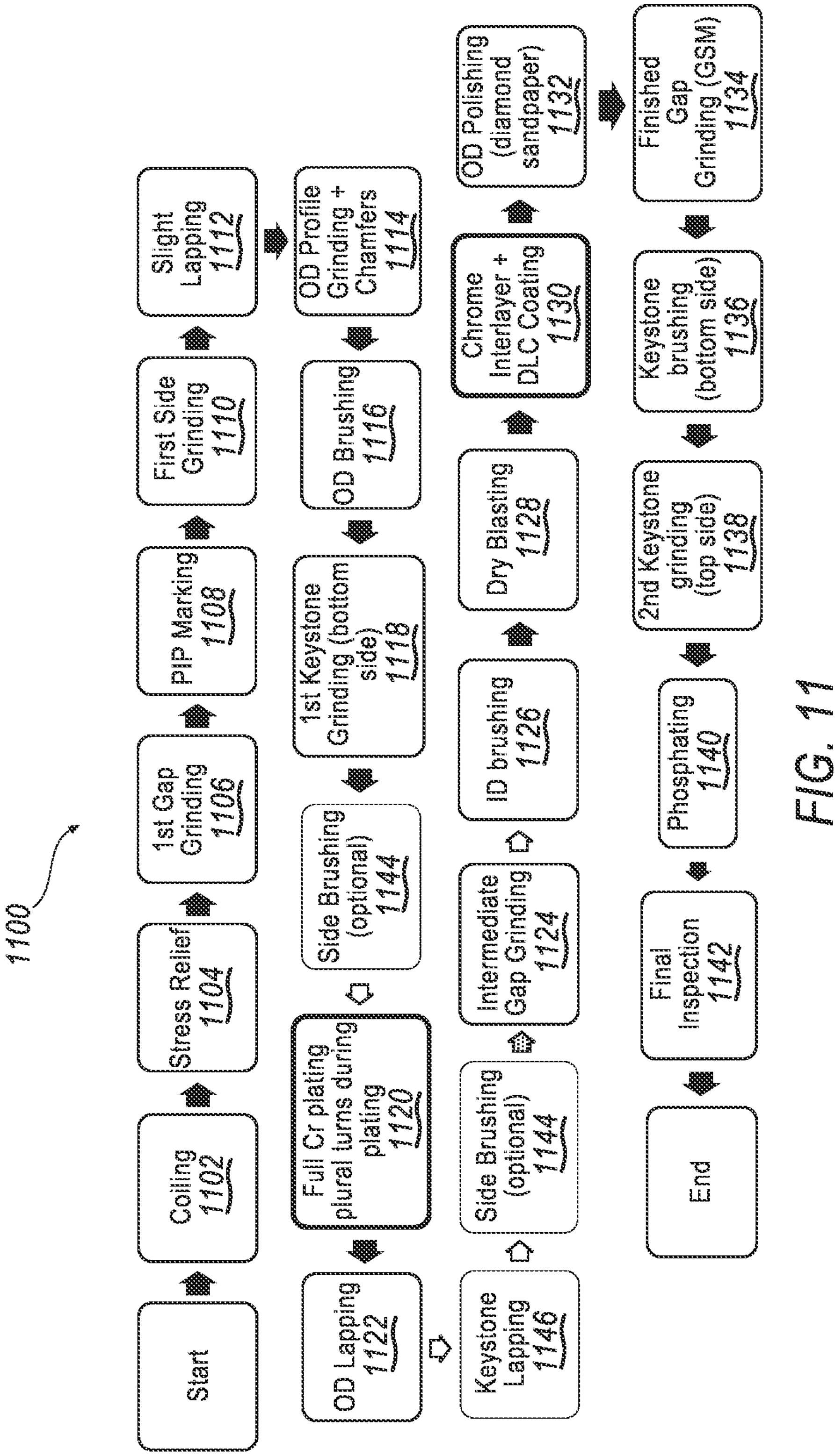
FIG. 11 illustrates steps of a method according to the disclosure.

FIG. 11 shows an exemplary method 1100 for producing a piston ring according to a further implementation. FIG. 11 differs from FIG. 10 in the order of keystone lapping 1146, wherein pursuant to the method 1100, keystone lapping 1146 is performed before the second/intermediate gap grinding 1124 (e.g., after OD lapping 1122), and may help form the diminishing thickness of the chrome coating at the upper outer corner region. The keystone lapping 1146 flattens the outer surface of the chromium coating along the second (bottom) face by some of the chromium material to form the chromium coating layer with a desired thickness (10 μm to 20 μm), thickness variation (≤5 μm), and straightness (≤2

μm). The OD lapping 1122 and keystone lapping 1144 together shape and flatten the outer profile of the chrome coated ring (e.g., outer contact surface, first/top and second/bottom faces). The method 1100 may further include an optional side brushing 1144 on the first and/or second face after the keystone lapping 1146, to break up nodules on the chrome surface. Otherwise, the process remains the same as in FIG. 10, as represented by like reference numerals.

It will be appreciated that grinding is distinct from lapping, wherein lapping helps increase smoothness and straightness (flatness), whereas grinding removes more material than lapping and creates rougher surfaces.

Therefore, according to the disclosure and FIGS. 5 and 6A-6C, and according to the method of FIGS. 7-11, chromium coating layer 514 is deposited on an outer surface 530 of base portion 502 at step 706, 820, 920, 1020, 1120. Outer surface 530 encompasses the periphery of base portion 502, including on the first face 506, the second face 508, the outer contact surface 504, and the inner contact surface 510 facing sides of ring 500. After shaping at least the outer diameter of the base portion 502 along the outer contact surface 504 (e.g., by OD lapping 822, 922, 1022, 1122 and/or grinding) to remove excess chrome material, DLC 512 is deposited (e.g., via PVD) on an external surface of chromium coating layer 514 on the outer contact surface 504 facing side of ring 500 at step 710, 830, 930, 1030, 1130. Pursuant to an implementation, a chrome interlayer 532 may also be deposited (e.g., via PVD) on the external surface of the chromium coating layer 514 along the outer contact surface 504, to improve the adhesion between the chromium coating layer 514 and DLC 512. Thereafter, first face 506 is ground 838, 938, 1038, 1138 such that chromium coating later 514 is removed from first face 506 and outer surface 530 is exposed on the first face 506 facing side of ring 500. Chromium coating later 514 remains on outer surface 530 on second face 508, outer contact surface 504, and inner contact surface 510 facing sides of ring 500. At step 712, 840, 940, 1040, 1140, the phosphate layer 516 is deposited on the first face 506 by phosphating such that phosphate layer 516 is deposited on outer surface 530 where chromium coating layer 514 was removed. The phosphate layer 516 may additionally be deposited on outer corner surface 536 in upper outer corner region 518. Outer corner surface 536 is an outer surface of DLC layer 512 as DLC layer 512 extends from diminishing thickness 608 to zero thickness 610. As such, phosphate layer 516 may partially overlay/overlap DLC 512 on outer corner surface 536 so as to wrap around upper outer corner region 518 and lay on outer surface 536 of DLC layer 512. the phosphate layer 516 also is deposited on inner corner surface 534 in upper inner corner region 522. Inner corner surface 534 is an outer surface of chromium coating layer 514 as chromium coating layer 514 extends from diminishing thickness 620 to zero thickness 624. The phosphate layer 516 may partially overlay/overlap the chromium coating layer 514 on inner corner surface 534 so as to wrap around upper inner corner region 522 and lay on outer surface 534 of chromium coating layer 514.

Figure 12:
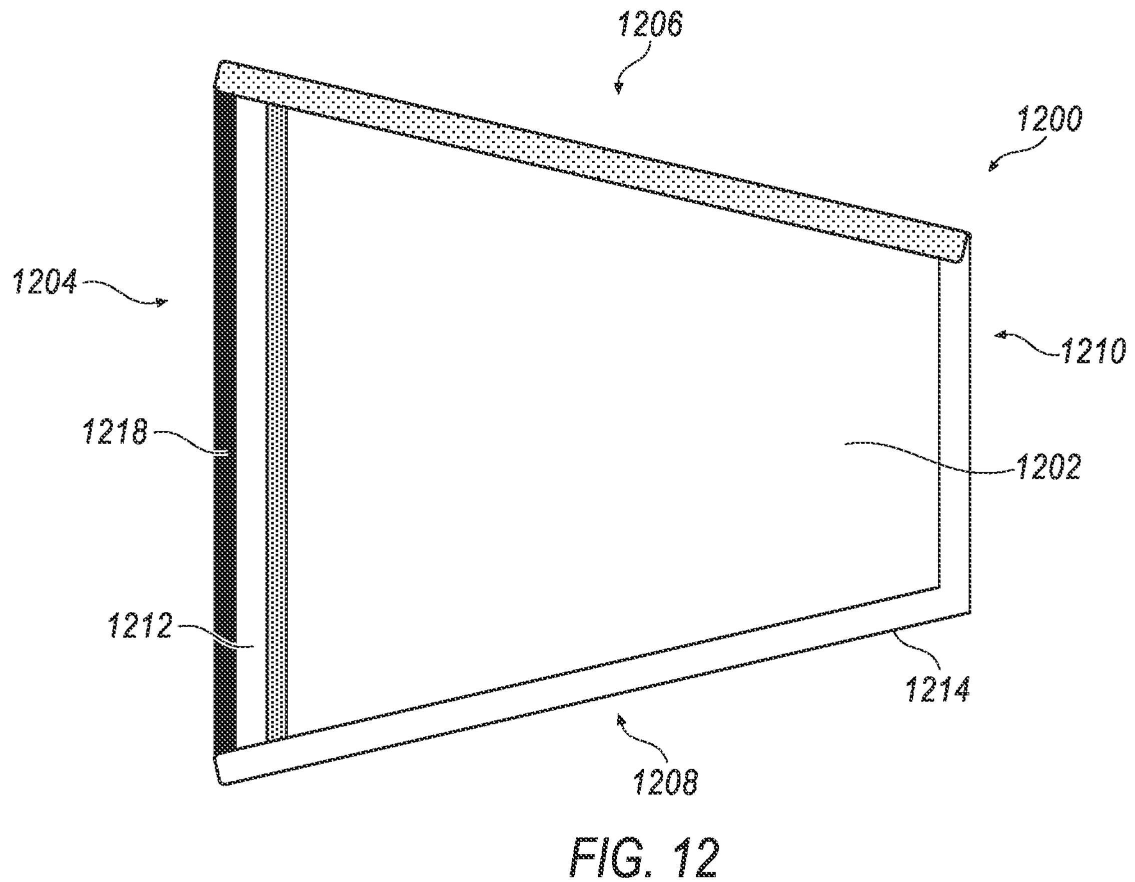
FIG. 12 illustrates a cross sectional view of a piston ring according to a further example.

In another example, as illustrated in FIG. 12, a polymer layer 1218 is provided. A piston ring 1200 includes a base portion 1202 formed of a metallic material such as steel. The base portion includes an outer contact surface 1204 extending between a first face 1206 (e.g., the upper face) and a second face 1208 (e.g., the lower face) that is opposite first face 1206 of piston ring 1200. The base portion includes an inner contact surface 1210 extending between first face 1206 and the second face 1208 of piston ring 1200. A chromium coating layer 1214 is formed or positioned on second face 1208, outer contact surface 1204, and inner contact surface 1210. A DLC layer 1212 is formed on outer contact surface 504 over chromium layer 1014, and a chrome interlayer (not shown) may be interposed between the DLC 1212 and chromium coating layer 1214. A phosphate layer 1216 is formed on first face 1206. Polymer layer 1218 is formed over DLC layer 1212 such that polymer layer 1218 covers an external surface of DLC layer 1212. The high hardness of DLC layer 1212 makes breaking-in piston ring 1200 difficult during early engine life. Polymer layer 1218 provides a solid lubricant to outer contact surface 1204 of piston ring 1200 to allow faster break-in of engine components and improve durability of piston ring 1200. Polymer layer 1218 is a resin bonded coating, and in particular, may include a resin bonded polyamide imide (PAI) or a resin bonded polytetrafluoroethylene (PTFE) with a molybdenum disulfide addition. Piston ring 1200 may be formed, for example, according to the methods illustrated in FIGS. 7-11 with the addition of applying polymer layer 1218 to outer contact surface 1204 over DLC layer 1212. As such, it will be appreciated that the polymer layer 1218 may be applied to DLC 512 shown in FIGS. 5-6C, for example, without departing from the scope of the disclosure.

In an example, phosphate layer 1016 is approximately ≤3 μm, e.g., approx. 2-3 μm. Polymer later 1018 is approximately 5-15 μm, e.g., approx. 10 μm. Chromium coating layer 1014 is approximately 10-20 μm, with a thickness variation of ≤5 μm and a flatness (at least on the second face 508 and inner contact surface 510 including corner regions 520, 524) of ≤2 μm. The chrome interlayer may be approximately ≤1 μm. The DLC layer may be approximately 2-25 μm.

It is to be understood that the above description is intended to be illustrative and not restrictive. Many applications other than the examples provided would be upon reading the above description. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the disclosure is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as “a,” “the,” “said,” etc. should be read to recite one or more of the indicated elements unless a claim recites an explicit limitation to the contrary.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

“One or more” includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both element, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A piston ring, comprising:
a base portion formed of a metallic material;
an outer contact surface and an inner contact surface extending between a first face and a second face that is opposite the first face of the piston ring;
a chromium coating layer on the inner contact surface, the outer contact surface, and the second face;
a layer of diamond-like carbon (DLC) disposed over the chromium coating layer on the outer contact surface;
a phosphate layer provided on the first face; and
wherein the phosphate layer is disposed directly on the metallic material of the base portion of the first face between an upper outer corner region and an upper inner corner region of the base portion.

2. The piston ring of claim 1, wherein the phosphate layer partially overlaps the DLC at the upper outer corner region of the base portion and partially overlaps the chromium coating layer at the upper inner corner region of the base portion.

3. The piston ring of claim 2, wherein the phosphate layer has a diminishing thickness along the upper outer corner region and the upper inner corner region.

4. The piston ring of claim 1, further comprising a physical vapor deposition (PVD) chrome interlayer interposed between the DLC and the chromium coating layer along the outer contact surface.

5. The piston ring of claim 1, further comprising a polymer layer overlaying the DLC.

6. The piston ring of claim 1, wherein the DLC has an approximately constant thickness along the outer contact surface and a diminishing thickness at a lower outer corner region of the base portion and the upper outer corner region of the base portion.

7. The piston ring of claim 6, wherein:
the chromium coating layer has an approximately constant thickness along the outer contact surface, the lower outer corner region, the second face, a lower inner corner region of the base portion, and the inner contact surface; and
the chromium coating layer has a diminishing thickness at the upper outer corner region and the upper inner corner region of the base portion.

8. The piston ring of claim 1, wherein the chromium coating layer has a thickness of between 10 μm and 20 μm with a thickness variation of equal to or less than 5 μm, and wherein the chromium coating layer has a flatness of equal to or less than 2 μm along the second face and the inner contact surface.

9. A piston ring, comprising:
a base portion formed of a metallic material, the base portion including an outer contact surface and an inner contact surface extending between a first face and a second face that is opposite the first face;
a chromium coating layer on the inner contact surface, the outer contact surface, and the second face;
a layer of diamond-like carbon (DLC) disposed over the chromium coating layer on the outer contact surface;
a phosphate layer provided on the first face;
wherein the layer of DLC has a diminishing thickness at a lower outer corner region of the base portion and an upper outer corner region of the base portion; and
wherein the phosphate layer partially overlaps the DLC at the upper outer corner region and partially overlaps the chromium coating layer at an upper inner corner region of the base portion.

10. The piston ring of claim 9, wherein the layer of DLC has an approximately constant thickness along the outer contact surface.

11. The piston ring of claim 9, wherein the chromium coating layer has a diminishing thickness at the upper outer corner region.

12. The piston ring of claim 11, the chromium coating layer has an approximately constant thickness along the outer contact surface, the lower outer corner region, the second face, a lower inner corner region of the base portion, and the inner contact surface.

13. The piston ring of claim 9, wherein the phosphate layer is disposed directly on the metallic material of the base portion of the first face between the upper outer corner region and the upper inner corner region of the base portion.

14. The piston ring of claim 9, wherein the phosphate layer has a diminishing thickness along the upper outer corner region and the upper inner corner region.

15. The piston ring of claim 9, further comprising a physical vapor deposition (PVD) chrome interlayer interposed between the DLC and the chromium coating layer along the outer contact surface.

16. The piston ring of claim 9, further comprising a polymer layer overlaying the DLC.

17. The piston ring of claim 9, wherein the chromium coating layer has a thickness of between 10 μm and 20 μm with a thickness variation of equal to or less than 5 μm, and wherein the chromium coating layer has a flatness of equal to or less than 2 μm along the second face and the inner contact surface.

18. The piston ring of claim 1, wherein the chromium coating layer fully covers the inner contact surface, the outer contact surface, and the second face.

19. The piston ring of claim 1, wherein the chromium coating layer is further disposed on the upper outer corner region, the upper inner corner region, a lower outer corner region, and a lower inner corner region.

20. The piston ring of claim 9, wherein the chromium coating layer fully covers the inner contact surface, the outer contact surface, and the second face.

* * * * *